United States Patent
Oster

(10) Patent No.: US 6,644,973 B2
(45) Date of Patent: Nov. 11, 2003

(54) SYSTEM FOR IMPROVING READING AND SPEAKING

(76) Inventor: William Oster, 909 Army Rd., Baltimore, MD (US) 21204

( * ) Notice: Subject to any disclaimer, the term of this patent is extended or adjusted under 35 U.S.C. 154(b) by 21 days.

(21) Appl. No.: 09/858,700

(22) Filed: May 16, 2001

(65) Prior Publication Data

US 2001/0046659 A1 Nov. 29, 2001

Related U.S. Application Data

(60) Provisional application No. 60/204,575, filed on May 16, 2000.

(51) Int. Cl.$^7$ .............................................. G09B 17/00
(52) U.S. Cl. ...................... 434/178; 434/185; 434/167; 434/156
(58) Field of Search ................................ 434/156, 157, 434/167, 178, 185

(56) References Cited

U.S. PATENT DOCUMENTS

| | | | | |
|---|---|---|---|---|
| 3,167,871 A | * | 2/1965 | Brooks | 35/35 |
| 3,453,749 A | * | 7/1969 | Snedeker, Jr. | 35/35 |
| 4,143,648 A | * | 3/1979 | Cohen et al. | 128/1 |
| 4,212,119 A | * | 7/1980 | Tomatis | 35/35 |
| 4,327,252 A | * | 4/1982 | Tomatis | 179/1 |
| 4,464,119 A | * | 8/1984 | Vildgrube et al. | 434/185 |
| 4,605,975 A | * | 8/1986 | Beaman | 360/62 |
| 4,641,343 A | * | 2/1987 | Holland et al. | 381/48 |
| 4,662,847 A | * | 5/1987 | Blum | 434/185 |
| 4,710,877 A | * | 12/1987 | Ahmed | 364/419 |
| 5,393,236 A | * | 2/1995 | Blackmer et al. | 434/169 |
| 5,503,560 A | * | 4/1996 | Stentiford | 434/167 |
| 5,634,086 A | * | 5/1997 | Rtischev et al. | 395/2.79 |
| 5,791,904 A | * | 8/1998 | Russell et al. | 434/185 |
| 5,991,594 A | * | 11/1999 | Froeber et al. | 434/317 |
| 5,995,932 A | * | 11/1999 | Houde | 704/261 |
| 6,086,380 A | * | 7/2000 | Chu et al. | 434/307 |
| 6,289,310 B1 | * | 9/2001 | Miller et al. | 704/268 |
| 6,413,098 B1 | * | 7/2002 | Tallal et al. | 434/185 |

* cited by examiner

Primary Examiner—Gene Mancene
Assistant Examiner—Frederick Nicolas
(74) Attorney, Agent, or Firm—Law Offices of Royal W. Craig

(57) ABSTRACT

A system for reading training for improving a subject's reading speed and comprehension. The reader reads aloud into a microphone attached to an amplifier and headset. The amplifier filters out the low frequency sounds and emphasizes the high and mid-range frequency sounds as the sounds are directed to the reader's dominant ear, which allows the reader to listen attentively with his or her dominant ear, clarifying perception and speeding the listening process. The reader is taught reading protocol, such as emphasizing, pronunciation, articulation, breathing, pausing. The reader intermittently looks into a mirror placed strategically so that he or she can observe posture and lip movement and make adjustments to these reading protocol components. The reader repeats the reading aloud and feedback until reading speed and comprehension are improved to the desired level. The reading improvement training system (inclusive of training tools and method of using the tools) improves reading skills, e.g., teaches a reading style with proper inflection as if the reader is telling a story to someone across the room.

12 Claims, 7 Drawing Sheets

SYSTEM FOR IMPROVING READING AND SPEAKING

The present application derives priority from U.S. Provisional Patent application No. 60/204,575 filed on May 16, 2000, William Oster, applicant.

BACKGROUND OF THE INVENTION

1. Field of the Invention

The present invention relates to systems and methods for improving reading and speaking skills, and in particular, to a set of tools and a method of using the tools to allow a user to self-develop their active reading, listening and speech skills, thereby improving speed and comprehension.

2. Description of the Background

Encouraging self-reading promotes literacy. Nearly every study that has examined the relationship between self-reading and literacy development has found a correlation. The results show that free reading leads to better reading comprehension, a more mature writing style, increased vocabulary, improvement in spelling, and a greater sense of language forms and conventions (Krashen, 1993, p. 12). In recent years great emphasis has been placed on improving reading skills for readers of all ages. Programs abound, such as "DEAR" (Drop Everything And Read"), Silent Sustained Reading ("SSR"), and others which allow students, teacher, principals, and all other adult staff to read silently in a book of their choice for a few minutes each day. The singular purpose of these programs is to exercise reading as a skill.

Partly as a result of the emphasis on reading, there have been certain efforts to improve reading skills by fine-tuning the actual mechanics of reading. For example, Reading by Phonics is a well-known method which teaches the reader to read phonetically. Similarly, a number of software programs have been written which attempt to improve reading speed and comprehension.

U.S. Pat. No. 6,056,551 shows a method of and apparatus for computer aided reading training whereby text is displayed on a video monitor screen, segmented into textual portions, each portion appearing for a duration and quantity controlled by the user.

U.S. Pat. No. 5,147,205 shows a computerized tachistoscope that flashes successive groups of words at an increasingly greater speed, to assist in improving the reader's reading rate.

U.S. Pat. No. 6,195,640 shows a method of allowing a reader to dictate the position and speed at which content is converted to audio in an audio reader. The reader's reading drives the text to speech conversion.

Unfortunately, these and like systems can be expensive and time consuming, requiring an investment in the software and in the time to learn and use the software. More importantly, the effectiveness is uncertain (aside from the direct effect of more reading).

According to the so-called "Tomatis" effect, any modification in the sound information which a subject receives induces a transformation of his/her vocal supply, i.e. of the physical characteristics of the sound message which he/she emits by speaking or singing. See, U.S. Pat. No. 4,212,119 to Tomatis, issued Jul. 15, 1980. Tomatis suggests an electronic device that improves listening skills by alerting the human ear by osseous conduction that a sound is on the way, and then by transmitting the sound to the ear only after the ear has been alerted previously by osseous conduction.

The present inventor understands that a speaker does not hear an accurate representation of their own voice. This is because the acoustic signal is transmitted through the jaw bone and skull and is damped thereby. Other listeners hear a direct aerial transmission and an accurate representation. Building on the above-described Tomatis effect, it is perceived that a modification of the sound information which a subject receives while reading aloud to eliminate the damped low frequency components will induce a positive transformation of the physical characteristics of the sound message which he/she emits by speaking. The speaker will try to read and speak more clearly based on accurate feedback, and this will improve vocabulary and reading comprehension as well as other communicative skills.

Building on the above, it would be greatly advantageous to provide a reading improvement training system (inclusive of training tools and method of using the tools) to improve reading skills, e.g., to teach a reading style with proper inflection as if the reader is telling a story to someone across the room. The system should be low cost, provide immediate feedback to the user, and show positive results in improved reading ability within a short time frame. The approach would preferably be a structured, systematic, multi-sensory (visual, auditory, kinesthetic, and tactile) training method that would succeed in teaching linguistic concepts and relationships of language (spatial, temporal, comparative), and to improve vocabulary and reading comprehension as well as other communicative skills.

SUMMARY OF THE INVENTION

It is therefore an object of the present invention to provide a method for improving a reader's reading speed and comprehension, whereby the reader reads aloud into an amplifier that sends the reader's voice to a earphone receiver positioned in the reader's dominant ear, thereby allowing the reader to hear and assimilate his/her own reading.

It is a further object of the present invention to provide a method for improving a reader's reading skills whereby the reader, while reading, practices breathing techniques and pauses between words, while intermittently looking into a mirror, to improve confidence and self esteem in reading abilities.

It is a further object of the present invention to provide a set of tools for use in practicing the method described herein, said tools including a microphone headset to be worn by the reader, an amplifier, a mirror device, and any subject text.

The foregoing method begins with the reader reading aloud into a microphone that is attached to an amplifier which amplifies the reader's voice. The reader's voice is amplified so as to dampen low frequency sound while enhancing higher and mid-range frequency sound. The reader is energized by the sound of their own voice, and more so by the enhanced frequency sound. Moreover, the low frequency feedback is filtered out to prevent the reader from being lulled into a near-sleep state. The amplified signal is output to a speaker (headphone) positioned in the reader's dominant ear. By outputting the reader's own amplified voice and relying on the principle of ear dominance (i.e., directing sound to the faster processing ear), it has been found that the present system and method accelerates language decoding and reading fluency by combining immediate aural feedback and safe sound-frequency filters to clarify perception and to speed the listening process. Conscious listening with the dominant ear of the amplified voice signal allows the whole brain to be alert and attentive and allows the listener to maintain focus and attention. As students hear themselves establish a natural flow and rhythm while reading aloud, it becomes easier to understand what is being read. With repetition, the reader becomes more reflexive and the brain has more energy for comprehension. In addition to the aural feedback, visual feedback is provided with the assistance of a mirror device that the users views himself/herself in. This promotes principles such as standing up straight, breathing properly, moving mouth properly, pausing between words, and alternating reading aloud with counting on memorized words energetically into a mirror.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
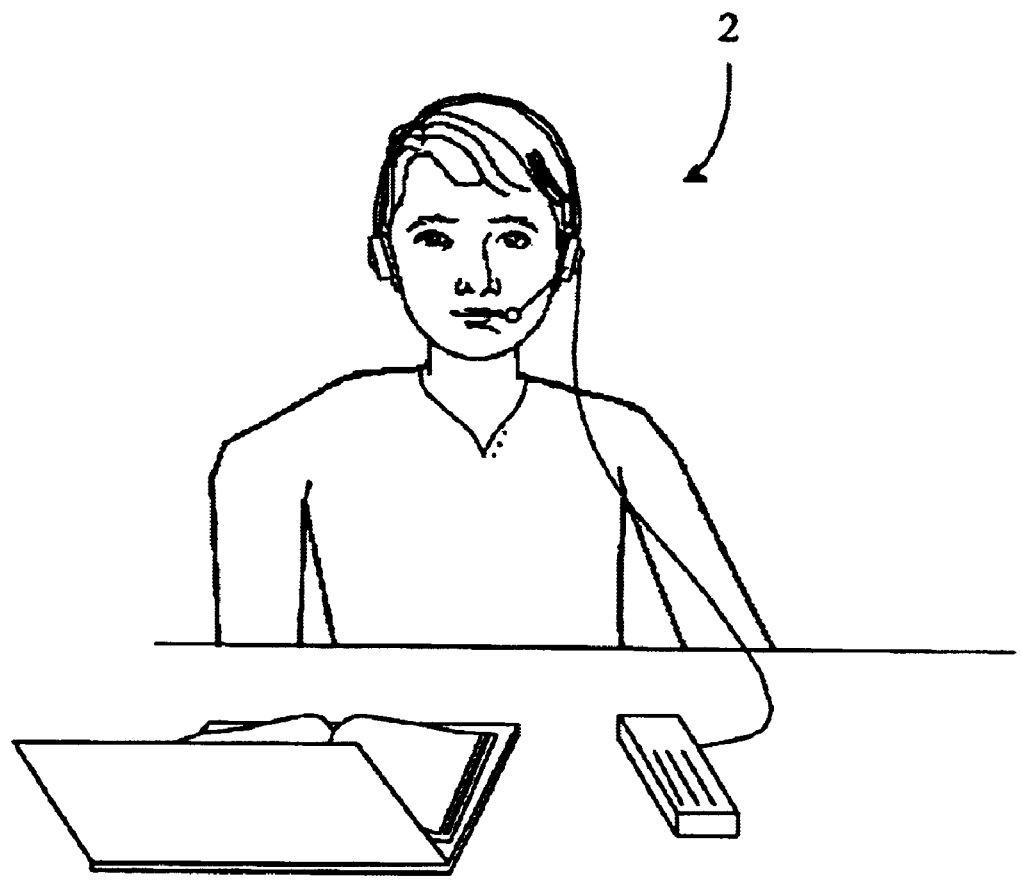
FIG. 1 is a conceptual diagram of the system according to the present invention.
Figure 2:
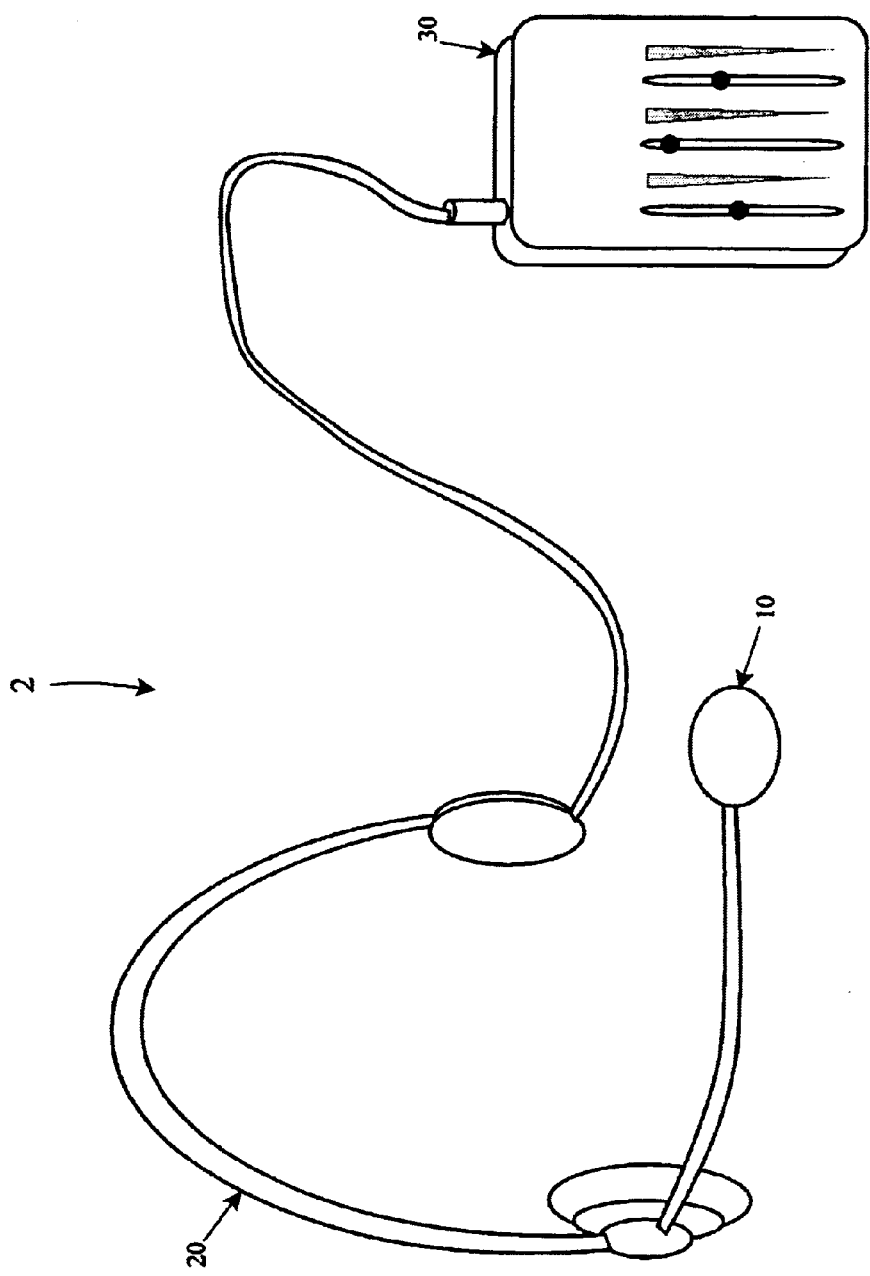
FIG. 2 is an exploded view of the headset, microphone and amplifier device.

FIG. 1 is an exemplary perspective drawing of a user using the system according to the present invention. The physical components of the system include the "reading coach" 2 which is a specialized amplifier 30 coupled to a microphone headset 10, 20 that is worn by the user. In addition, the user is positioned in front of a mirror 40. The microphone 10 is connected to the input of an amplifier 30, and amplifier 30 amplifies the reader's voice in order to dampen low frequency sound while enhancing the higher and mid-range frequency sound. Thus, amplifier 30 may be any conventional band-pass amplifier, preferably with a bandpass gain in the 750–4000 Hz range. Frequencies below this range are filtered out, frequencies toward the middle of this range receive the peak decibel enhancement of approximately 6 dB, and frequencies toward the upper end of that range likewise receive a decibel enhancement, albeit somewhat lesser than mid-range. The amplifier 30 may use conventional automatic gain control electronics to accomplish the foregoing, or a manual equalizer can be used as shown in FIG. 2. Either way, the amplified signal is output to a speaker (headphone) 20 that is positioned on the reader's dominant ear.

In accordance with the method of the invention, the user reads aloud into a microphone 10 while simultaneously and intermittently looking into the mirror 40 which is positioned in front. The present system combines three distinct learning principles to achieve a synergistic training effect. First, the amplifier 30 amplifies the reader's own voice inside of a higher and mid-range frequency band. This presents the user with immediate aural feedback in their own voice, not as normally heard conducted through (and damped by) the jaw bone, but naturally in a brighter higher tone. Listeners are more responsive to the sound of their own voice, and the use of sound-frequency filters clarifies perception, heightens awareness, and speeds the listening process. Second, the amplifier 30 outputs the user's voice to the user's dominant ear. This takes advantage of dichotic listening research, which weighs the integrity of brain systems used in language processing. Beginning in early childhood, subjects typically show higher scores on right, as opposed to left, ear measures (Pine et al., 1997), reflecting the left hemisphere's dominance for language ("right ear advantage"). See also, U.S. Pat. No. 5,434,924 to Jampolsky which shows a hearing aid employing adjustment of the intensity and the arrival time of sound at opposing ears to improve interaural perceptual balance and binaural processing. The Jampolsky device as well as the present invention rely on the principle of ear dominance (i.e., directing sound to the faster processing ear), and uses it to accelerate language decoding and reading fluency. Conscious listening with the dominant ear of the amplified voice signal allows the whole brain to be alert and attentive and allows the listener to maintain focus and attention. As students hear themselves establish a natural flow and rhythm while reading aloud, it becomes easier to understand what is being read. With repetition, the reader becomes more reflexive and the brain has more energy for comprehension. Third, in addition to aural feedback, an element of visual feedback is provided. This is accomplished with the assistance of the mirror device 40 in which the users views himself/herself. The visual feedback promotes mechanical speaking principles such as standing up straight, breathing properly, projecting the voice, moving mouth, and pausing between words. The visual feedback leads to more effective verbal communication and clarity of thought. The mirror effectively serves as a surrogate target (audience) for the user's reading efforts. By intermittently viewing the mirror while reading, the user can improve the simple skill of looking up at the audience and then returning to the proper place on a page.

These three distinct learning principles combine to maximize conscious listening by the user, such that they are alert, attentive, and maintain focus and attention. More importantly, repeated use of the present system conditions the user to employ the same conscious listening skills in all situations, thereby improving vocabulary and reading comprehension as well as communicative skills in general.

FIG. 2 is an exploded view of the reading coach device comprising the microphone 10, headset 20 and amplifier 30.

Amplifier 30 is a voice amplifier engineered to provide clear, hands-free, speaking capability. The amplifier 30 preferably includes a thick walled, polycarbonate case for durability and can easily be worn on a belt, strap, or turnout coat. The amplifier 30 may be powered by a 9 Volt alkaline battery, and a rotary volume switch and three frequency slide switches facilitate hand control. The amplifier 30 electronics are those of a conventional band-pass amplifier with a gain in the 1000–4000 Hz range. This way, amplifier 30 is tuned for the human voice. Ambient noise and low frequency noise is filtered out, and the body worn voice amplifier 30 is designed to increase vocal output within the bandpass 1000–4000 Hz range to more accurately reflect the tone of the voice as heard by others (not muted by voice conduction through the jawbone). The body worn voice amplifier 30 can boost vocal output by as much as 15 dB, using the headset style microphone 10. Voice amplifier 30 may be either stereo or monaural and is connected to the headset for inputting sound from the microphone 10 and outputting the sound to only one earphone speaker 20, that one worn on the dominant ear. The headset preferably comprises a single-line telephone headset with at least one speaker 20 for the dominant ear (stereo headphones are also suitable) and a boom microphone 10, which may be a noise cancellation microphone. The headset should be adjustable for over-the-head stability or over-the-ear convenience, superior in sound quality; and connectable to single-line telephone jack. Plantronics Communications manufactures a variety of suitable headsets.

Mirror 40 may be any conventional mirror. However, the visual feedback element can be enhanced by a custom mirror as follows.

Figure 3:
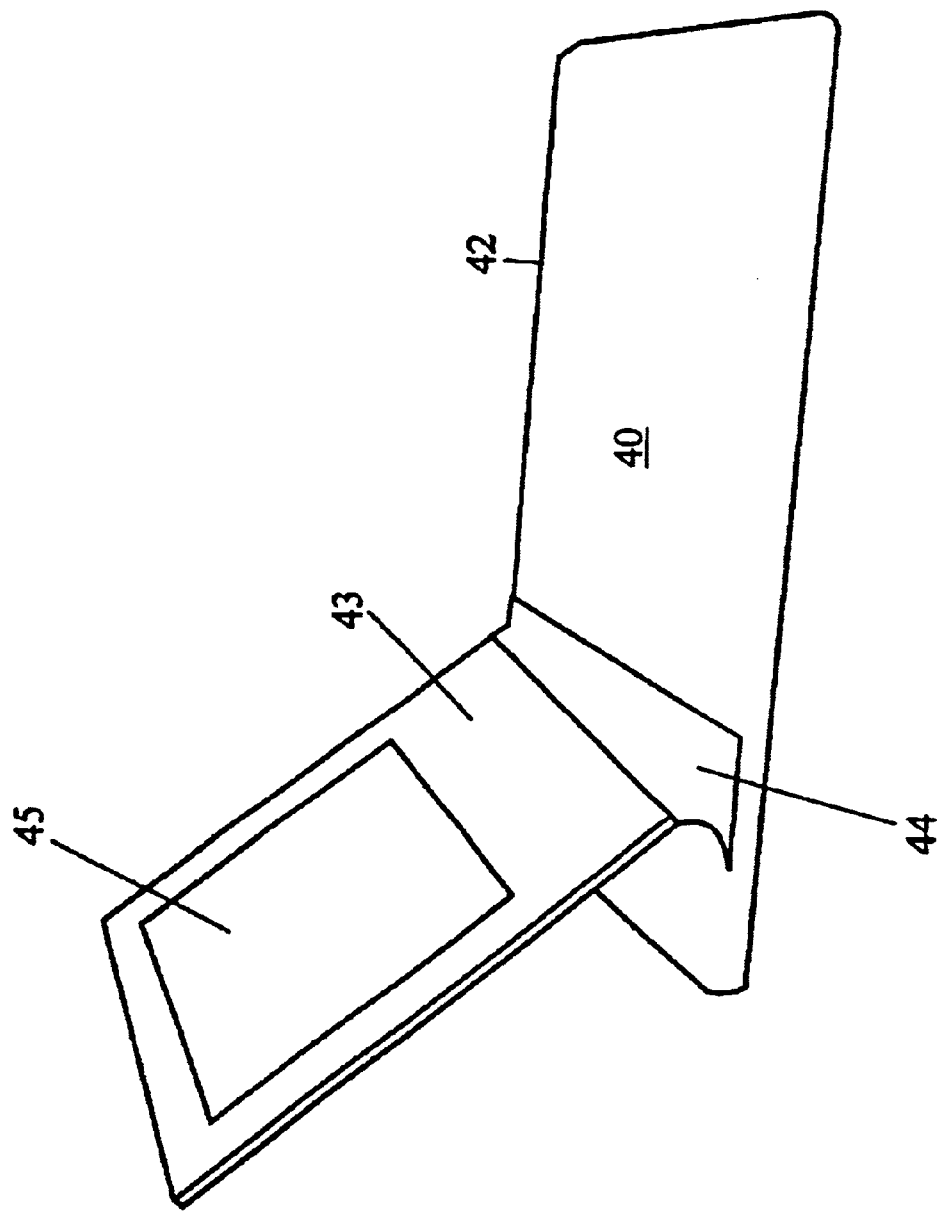
FIG. 3 is a perspective view of a mirror 40 suitable for use in conjunction with the microphone 10, headset 20 and amplifier 30 of FIG. 2.

FIG. 3 is a perspective view of a specialized mirror 40 most suitable for use in accordance with the present invention. Mirror 40 generally includes a base panel 42 for positioning on a table, and a mirror-support panel 43 mounted to the base panel 42 by a hinge 44. A reflective mirror 45 is mounted on the mirror-support panel 43. This configuration allows the user to position the mirror 45 at any angle much the same as a laptop display in order to see their own face fully and clearly from a sitting position. The angle is calculated to compel the user to maintain an upright and erect position, e.g., a proper reading position, and an angle of between 30–85 degrees achieves this goal depending on the physical characteristics of the user.

Figure 4:
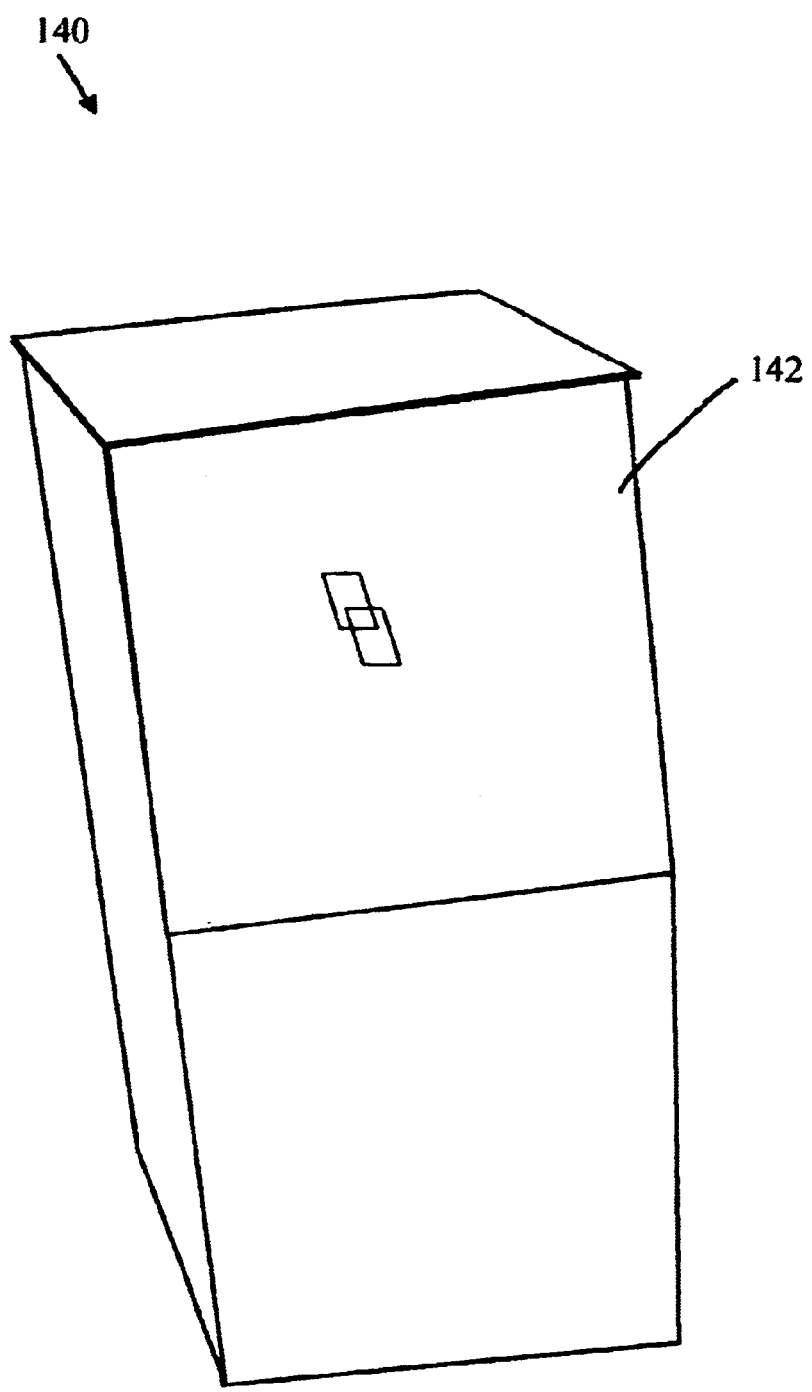
FIG. 4 is a perspective view of an alternate embodiment of a mirror 140 suitable for use in conjunction with the microphone 10, headset 20 and amplifier 30 of FIG. 2.

In certain situations it will be helpful to video tape the user's exercise for later viewing by a therapist. FIG. 4 is a perspective view of an alternate embodiment of a mirror box 140 suitable for use in discretely video taping and or remote viewing of the exercise.

Figure 5:
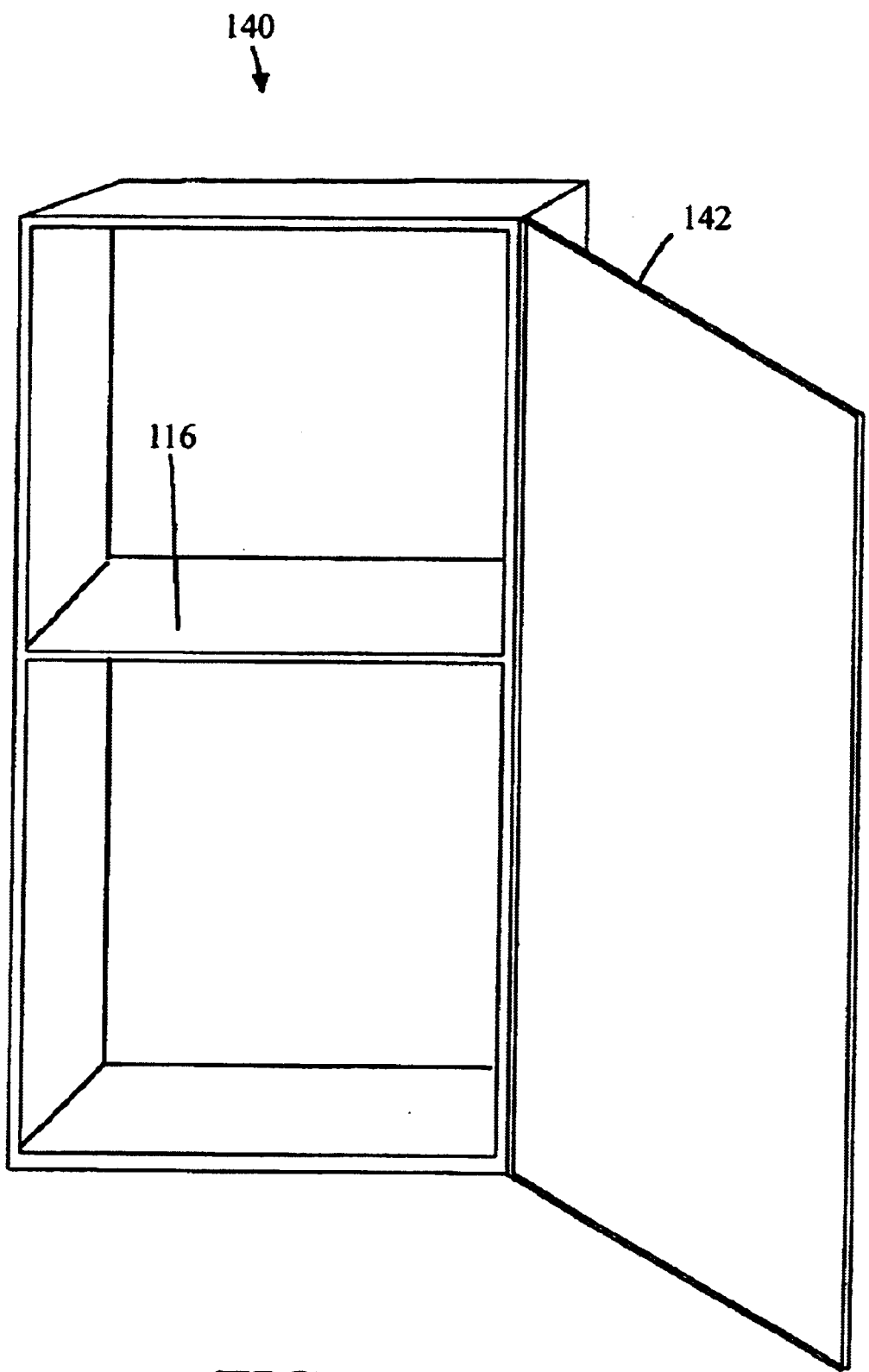
FIG. 5 is a perspective view of the mirror 140 as in FIG. 4 open to allow insertion of a video camera.

FIG. 5 is a perspective view of the mirror box 140 as in FIG. 4 shown in open position to allow insertion of a video camera. Mirror 140 box generally comprises a smoked plastic enclosure standing approximately 2" tall and adapted to be situated on a table. Mirror box 140 has a camera-supporting shelf 116 elevated approximately 1.5' from the table at eye level to a user seated in front. The front of mirror 140 exposes an angled one-way mirror panel 142 toward the user at an approximate 110 degree upward slant (from horizontal). This way, a video camera can be innocuously placed on the shelf behind mirror panel 142, and yet the user sees himself or herself while reading.

Figure 6:
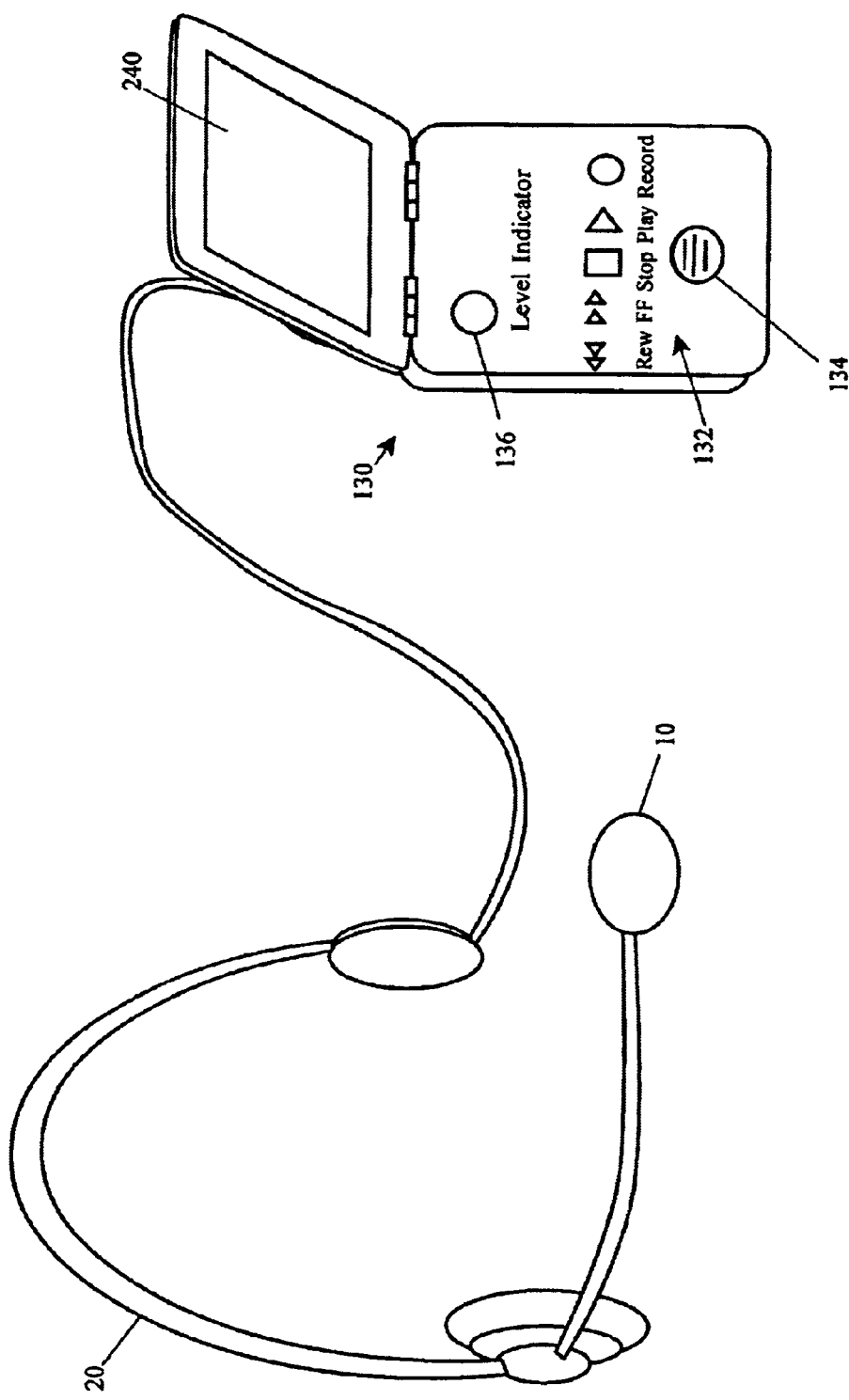
FIG. 6 is an exploded view of an alternative amplifier device 130 with a number of optional advanced features.

FIG. 6 is an exploded view of an alternative amplifier device 130 with a number of optional advanced features. Specifically, amplifier device 130 is substantially the same as amplifier 30 described previously, but additionally incorporates three optional features: 1) a flip-up mirror 240; 2) a voice recorder 132; and 3) a level sensing circuit with indicator 136.

Flip-up mirror 240 takes the place of the foregoing mirrors 40, 140, but does so in a more compact and handy manner. This is accomplished with an amplifier housing that is patterned after conventional cellular flip phones, e.g., a two piece hinged design with flip-up mirror 240 attached to the upper hinged portion. A small flip-switch (not shown) applies power to the amplifier 130 when the unit is opened. The flip-up mirror 240 is used much like a cosmetic compact so that the user can view themselves while reading aloud, and the flip angle is preferably fixed at a maximum angle of between 30–85 degrees as described above.

Voice recorder 132 may be a conventional digital or tape voice recording circuit which is built into the amplifier 130. Voice recorder 132 has play, record, rewind fast forward and stop functions as shown, and includes a microphone 134 for recording the subject's voice as he/she reads aloud. This way, the pre-recorded session can be played back at a later time for the user's benefit or for their therapist to facilitate compliance checking. In addition, the tape or memory can contain a pre-recorded track, the user mixing/recording over it for modeled reading. Either way, the pre-recorded session can be played back at a later time for the user's benefit or for their therapist to facilitate compliance checking. The voice recording circuit can be implemented in a number of conventional ways, such as, for instance, using STMicroelectronics® MPEG Layer 3 Audio Decoder chip with embedded ADPCM (Adaptive Differential Pulse Code Modulation) codec to allow voice recording and playback. This decoder chip adds both MP3 audio playback and also voice recording/playback capabilities with extremely low power consumption and minimal design effort. The compressed voice files are stored in an internal flash memory (not shown).

Finally, level sensing circuit with indicator 136 is designed to indicate to the user when their voice exceeds a pre-determined amplitude threshold. Preferably, the indicator 136 flashes red when the user's voice drops below a pre-determined amplitude threshold to provide negative reinforcement and encourage them to speak louder. The electronics behind the level sensing circuit with indicator 136 can be accomplished in a conventional manner using a red LED and a threshold detector circuit constructed using a standard comparator IC, preferably with adjustable threshold control.

Figure 7:
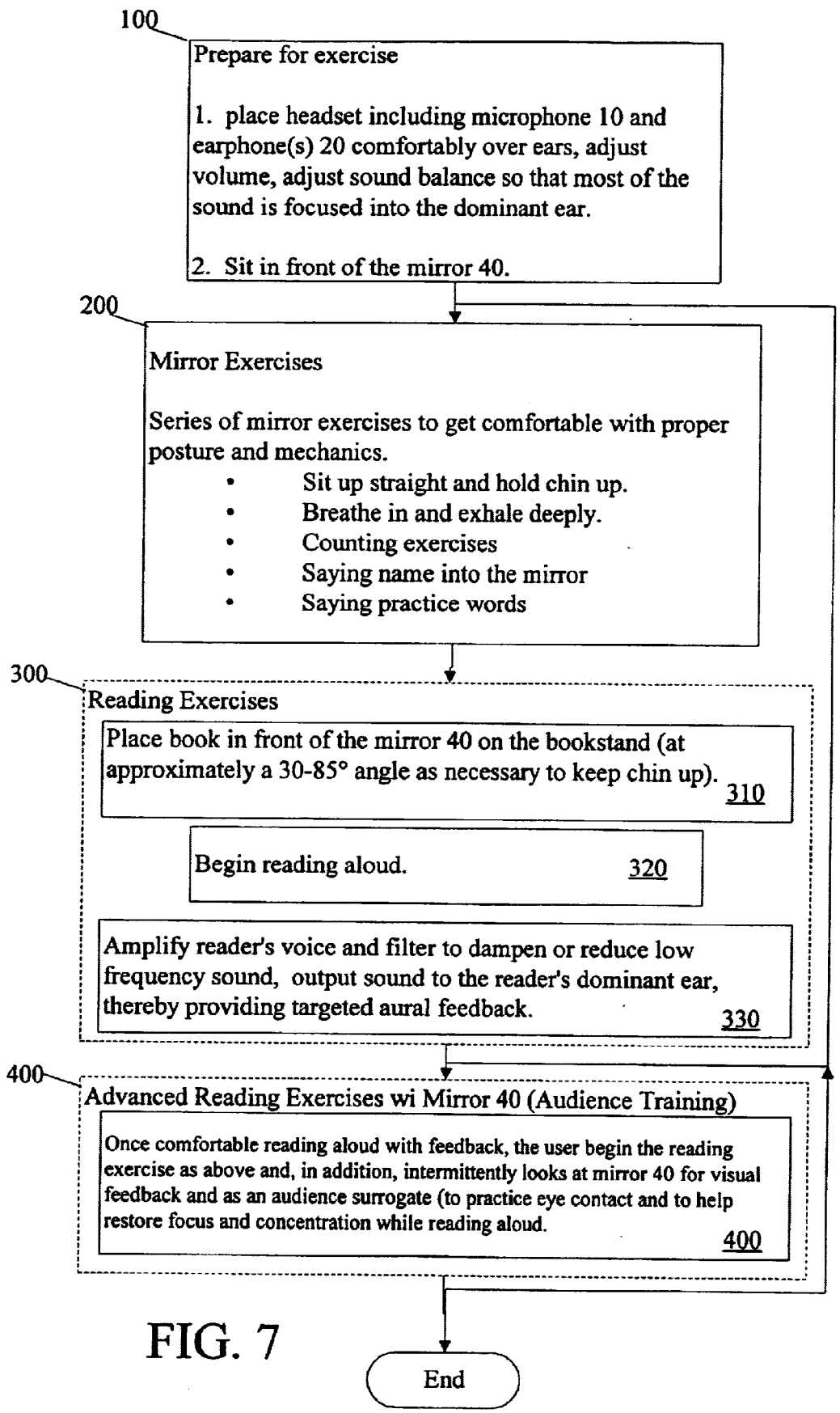
FIG. 7 is a flow-chart depiction illustrating the method steps of the present invention.

FIG. 7 is a flow-chart depiction illustrating the method steps of the present invention. The method relies upon oral reading as a way to improve fluency, as well as comprehension. Mastering oral reading with the system accelerates a student's silent reading rate, understanding and retention. The technique is especially effective with students who have had difficulty acquiring reading skill, and the impact can be observed both in measurable reading testing and in overall self-esteem. Students enjoy the process, they look, sound, and feel better as they read, and they carry these improvements into the classroom. A preliminary, controlled study by Mary J. Newman, M. A. at Mott Community College shows 12 to 13% gains for college freshman on national standardized tests after 5 hours of training.

The method begins at step 100 as the user place the headset including microphone 10 and earphone(s) 20 comfortably over the ears so that the microphone 10 is on the left side of the face. The microphone is adjusted so that it is about 1–2 inches in front of the mouth. The user adjusts the volume to a comfortable level, and adjusts the sound balance so that most of the sound is focused into the right ear. The user sits in front of the mirror 40.

At step 200 the user begins a series of mirror exercises to get comfortable with proper posture and mechanics. The mirror exercises are designed to focus attention on the body, and especially to get the user to keep their chin up. There is an oratory "sweet spot" in which the best projection can be obtained simply by tilting the head slightly (chin up) and thereby straightening the throat. The mirror exercises attempt to instill the sweet spot, and they may include the following example steps:

User must sit up straight and hold chin up.

Breathe in and exhale deeply. Inhale slowly again and begin counting.

Counting from one to ten, energetically, looking into the mirror. Push the sound up and out from behind your front teeth. Move your right hand, as though you're pushing the sound out.

Saying name into the mirror, three times.

Saying practice words a therapist/teacher gives, clearly and strongly.

Saying practice words three times, while watching mouth form the words.

After the initial mirror exercises at step 200, the user begins the reading exercise at step 300. During the reading exercise, at sub-step 310, the user places a book in front of the mirror 40 on the bookstand (at approximately a 45° angle). The angled viewing of the book makes the print clearer and also serves to energize the reading. The book or reading material can be any appropriate material for the reader's reading level, but should be interesting to the reader. The user then carries out the following reading exercises.

At sub-step 320 the user begins reading aloud . . . slowly enough to get the words right.

At sub-step 330, the microphone 10 receives and the amplifier 30 processes the readers voice. The reader's voice is amplified and filtered to dampen or reduce low frequency sound, which distracts and slows the brain's processing abilities, and emphasize/enhance high and mid-range frequency, which clarify sound, thereby charging the brain by higher and mid-range frequencies rather than dulling the brain by low frequencies. The amplifier 30 sends the sound to the reader's headset 20, which is focused on the reader's dominant ear, thereby providing specially amplified, specially directed immediate feedback. The user listens closely to the sound of each word in the earphones 20. If bi-aural headphones are used, then at least a small decibel enhancement of 6 db to the dominant ear is suggested, and approximately a 70–30 differential is presently preferred. On the opposite end of the spectrum, a monaural headphone may be used only on the dominant ear. In any case, conscious listening with the dominant ear allows the whole brain to be alert and attentive and allows the reader to maintain focus and attention. As the reader hers him or herself establish a natural flow and rhythm while reading aloud, it becomes easier to understand what is being read.

It is important to note that the user does not attempt to look at the mirror 40 during the initial reading exercise of step 300, and not until the user is comfortable with the concept of reading aloud with feedback.

After completing the initial set-up 100, initial mirror exercise 200, and reading exercise 300, the user continues to repeat alternate mirror exercises 200 and reading exercises 300 until comfortable and proficient. Once proficient, the user can begin (or substitute) a series of advanced reading exercises in step 400. Given a certain level of proficiency with reading aloud, the method of the present invention includes the incorporation of visual feedback during advanced reading exercises at step 400. During the advanced exercises 400, the user intermittently looks back at the mirror 40. Specifically, the reader looks intermittently into mirror 40 at step 400, to help restore focus and concentration when his or her mind begins to wander while reading aloud. The mirror 40 is placed at a strategic point in front of the reader to allow the reader to focus on his or her posture and movement of lips. This visual feedback, allows the reader to make adjustments to his or her posture, reading pace, and breathing. In addition, the mirror serves as a "target" for the user or a surrogate audience. The user looks at the mirror intermittently, and thereby gains practice in good public speaking where it is necessary to look the audience in the eye and then regain one's place in the reading material. The user sees themself and can adjust their public demeanor. As the user makes the adjustments, the reader continues to read aloud (as in step 320), showing improvement in the ability to sound out words, plus reading speed and comprehension, due to the visual feedback. Other advanced reading exercises may entail the following steps.

When able to read across a page without mistakes, hold the book in hand.

Read the story to the mirror 40 like a TV commentator; look up and return to the page without losing place.

Alternate silent reading with reading aloud.

The steps are then repeated from step 200 to allow the brain to adjust to a faster more efficient level of processing, retention, recall, and conscious understanding. With repetition, the reader becomes more reflexive and the brain has more energy for comprehension. Thus, in a short period of time, for example, in as little as multiple sessions for a total of five hours, the reader can see marked improvement in his or her reading speed and comprehension. As a result of the foregoing, the reader is taught a reading protocol. For example, the protocol emphasizes sitting up straight, pronunciation and articulation, breathing slow, exhaling completely, moving mouth, pushing sound from behind front teeth, speaking slowly up and out, pausing between words, and building energy in the voice. The reading improvement training system (inclusive of training tools and method of using the tools) improves reading skills, e.g., teaches a reading style with proper inflection as if the reader is projecting in a firm and assertive conversational voice. It is especially good for youths who are trying to assimilate phonics.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

I claim:

1. A method for self-improvement of a reader's reading skills comprising the steps of:

said reader reading aloud into a microphone while looking into a mirror, amplifying sound from said reading aloud in a range of approximately 750–4000 Hz to filter out low frequency sounds and enhance high and mid-range frequency sounds, playing a greater balance of the amplified sound into a dominant ear of said reader to compel dichotic listening of the reader's own amplified voice.

2. The method according to claim 1, wherein said step of reading aloud into a microphone is repeated, using reading protocols for feedback breathing, pronunciation and articulation, and pausing between words.

3. The method according to claim 1, further comprising the step of the reader looking intermittently into a mirror during said reading aloud step to provide visual feedback to the reader.

4. A system for self-improvement of reading skills, comprising:

a headset including hands-free microphone and at least one earphone corresponding to a dominant ear of a user;

an amplifier electrically connected to said microphone for receiving a signal therefrom when the user reads aloud and amplifying said signal so as to filter low frequency sound while enhance higher and mid-range frequency sound in a range of approximately 750–4000 Hz, said amplifier also being connected to said at least one earphone for outputting said amplified signal to the user's dominant ear to compel dichotic listening of the reader's own amplified voice.

5. The system for self-improvement of reading skills according to claim 4, wherein said amplifier further comprises a hinged housing with a flip-up mirror.

6. The system for self-improvement of reading skills according to claim 5, wherein opening of the flip-up mirror activates said amplifier.

7. The system for self-improvement of reading skills according to claim 4, wherein said amplifier further comprises a voice recorder for delayed playback of said user's voice.

8. The system for self-improvement of reading skills according to claim 4, wherein said amplifier further comprises a level sensing circuit with indicator for encouraging said user to conform his voice to a predetermined amplitude threshold.

9. The system for self-improvement of reading skills according to claim 4, further comprising a mirror for placement in front of said user for intermittent self-viewing during reading aloud and for voicing exercises.

10. The system for self-improvement of reading skills according to claim 9, wherein said mirror is mounted on an angularly-adjustable support panel for viewing.

11. The system for self-improvement of reading skills according to claim 9, wherein said mirror further comprises a one-way mirror mounted on an enclosure with an inner compartment to allow concealed placement of a camera therein.

12. A method for reading therapy comprising the steps of:

seating a subject in front of a mirror;

placing reading material in front of the subject for reading aloud;

placing a vocal feedback device on the subject, said vocal feedback device including a microphone connected to an amplifier for amplifying the subject's reading in a range of from 750–4000 Hz while filtering out lower frequency sound outside of said range, said headset also including an earphone for outputting said amplified signal primarily to the dominant ear of said subject;

prompting the subject to undertake a series of mirror exercises while viewing himself in said mirror to instill proper posture and mechanics;

prompting the subject to undertake a series of reading exercises while intermittently viewing himself in said mirror, said reading exercises comprising the subject reading material aloud and providing amplified and filtered vocal feedback of said reading to a dominant ear of the subject.

* * * * *